US006393302B1

United States Patent
O'Byrne

(10) Patent No.: US 6,393,302 B1
(45) Date of Patent: May 21, 2002

(54) SYSTEM AND METHOD FOR INCREASING CAPACITY OF A CELLULAR NETWORK BY CELL SITE RECONFIGURATION

(75) Inventor: Vincent A. O'Byrne, Brighton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/263,357

(22) Filed: Mar. 5, 1999

(51) Int. Cl.$^7$ ................................................. H04B 7/26
(52) U.S. Cl. .......................... 455/562; 455/561; 455/25; 455/446
(58) Field of Search ................................. 455/446, 447, 455/422, 423, 561, 562, 25

(56) References Cited

U.S. PATENT DOCUMENTS

| | | | | |
|---|---|---|---|---|
| 5,111,534 A | * | 5/1992 | Benner ........................ 455/447 |
| 5,365,571 A | * | 11/1994 | Rha et al. .................... 455/446 |
| 5,850,608 A | * | 12/1998 | Faruque ....................... 455/447 |
| 5,920,607 A | * | 7/1999 | Berg ............................... 379/1 |
| 5,940,774 A | * | 8/1999 | Schmidt et al. .............. 455/561 |
| 5,950,125 A | * | 9/1999 | Buhrman et al. ............ 455/422 |
| 5,960,349 A | * | 9/1999 | Chheda et al. .............. 455/446 |
| 5,970,410 A | * | 10/1999 | Carney et al. ............... 455/446 |
| 5,987,322 A | * | 11/1999 | Gupta et al. ................. 455/432 |
| 6,002,935 A | * | 12/1999 | Wang ........................... 455/447 |
| 6,035,219 A | * | 3/2000 | Brodie ......................... 455/447 |
| 6,038,443 A | * | 3/2000 | Kuo et al. .................... 455/466 |
| 6,038,453 A | * | 3/2000 | Kuo et al. .................... 455/446 |
| 6,052,599 A | * | 4/2000 | Driessen et al. ............. 455/500 |
| 6,061,567 A | * | 5/2000 | Mao et al. .................... 455/447 |
| 6,078,814 A | * | 6/2000 | Jeffries et al. ............... 455/447 |

OTHER PUBLICATIONS

Lee, "Mobile Cellular Telecommunications Systems,"McGraw–Hill Book Company, pp. 47–65 and 179–203, 1989.
Rha, "Frequency Reuse Scheme with Reduced Co–channel Interference for Fixed Cellular Systems," Electronics Letters, vol. 34, No. 3, pp. 237–238, Feb. 1998.
MacDonald, "The Cellular Concept," The Bell System Technical Journal, vol. 58, No. 1, Jan. 1979.

* cited by examiner

*Primary Examiner*—William Trost
*Assistant Examiner*—Congvan Tran
(74) *Attorney, Agent, or Firm*—James K. Weixel

(57) ABSTRACT

A cellular network includes first cell sites having a first layout and second cell sites, interspersed among the first cell sites, having a second layout. The layout refers to the orientation of the antennas in the cell sites. By making the second layout different than the first layout, the amount of interference in the network reduces and, thus, the capacity of the network increases.

7 Claims, 10 Drawing Sheets

SYSTEM AND METHOD FOR INCREASING CAPACITY OF A CELLULAR NETWORK BY CELL SITE RECONFIGURATION

FIELD OF THE INVENTION

The present invention relates generally to wireless communication systems and, more particularly, to a system and method for reducing interference and increasing the capacity of a cellular network.

BACKGROUND OF THE INVENTION

Cellular networks have remained relatively static since they were first designed in the late seventies. This original design included simple methods for assigning frequencies by sets and general rules regarding reuse distance, frequency assignments, and antenna orientation.

FIG. 1 is a diagram of a conventional three-sectored cell site deployment 100. Each cell site 110 includes three antennas, for example, antenna 120 pointing north (0°), antenna 130 pointing southeast (120°), and antenna 140 pointing southwest (240°). Ideally, an antenna transmits signals at full power levels within its sector and no signals beyond the cross-over points between sectors. In practice, however, a gradual fall-off results with any angular deviation from the bore sight (i.e., the direction of the antenna). This fall-off has increased in recent years because cellular providers use narrower antennas to reduce interference between antennas in the same cell site.

FIG. 2 is a diagram of power levels of signals transmitted by a typical antenna deployed in a cellular network. In the figure, 1̂ identifies the highest power levels along the bore sight and 2̂ identifies the decreased power level at the cross-over points between sectors. The power loss at the cross-over points can be as much as 10 dB for very narrow beam antennas.

FIG. 3 is a diagram identifying power levels of the cell sites in the conventional cell site deployment of FIG. 1. FIG. 3 identifies the power levels at the cell edges, using 1̂ to identify the highest power level along the bore sight of an antenna and 2̂ to identify the decreased power level at the cross-over points between sectors. Location 310 identifies a point of intersection along the bore sights of three antennas from the three closest cell sites. Location 320 identifies a point of intersection of six antennas, two from each of the three closest cell sites.

At points of intersection, such as location 320, six potential signals of equal power levels exist from the three closest cell sites. In the case of Code Division Multiple Access (CDMA) systems, these signals include pilot and associated traffic channels. In the case of analog systems, such as Advanced Mobile Phone Systems (AMPS), these signals include analog channels. At all points, for example location 320, the signals from the different antennas undergo log-normal shadowing, which is the variation of the average power level due to reflections from buildings and other structures. This can result in ping-ponging between the cell sites and increased interference, because a signal not used by a receiver constitutes interference.

FIG. 4 is a diagram showing the effect of interference caused by second tier cell sites in the conventional cell site deployment of FIG. 1. Second tier cells sites include a second ring of cell sites with respect to a point of interest. In FIG. 4, cell sites 410–430 are second tier cell sites with respect to an intersection point at location 320.

Cell sites 410–430 include antennas 415–435, respectively, pointing along their bore sights to location 320. At location 320, the closest cell sites 440–460 transmit signals at low power while the second tier cell sites 410–430 transmit signals at full power (i.e., along the bore sights of their antennas) in this direction. The signals from the second tier cell sites 410–430 result in added interference at location 320.

Typically, the path loss for a conventional cell site deployment, such as the one shown in FIG. 1, is 40 dB per decade. This results in three additional signals at location 320 that have power levels of 12 dB-γ below the power levels of the other signals at this location, where γ refers to the antenna loss at the cross-over point relative to the bore sight gain. Thus, if the antenna pattern drops by 6 dB at a deviation of 120° from its bore sight, then a total of nine signals within 6 dB of each other exist at location 320.

In a propagation environment where the path loss exponent is much less than 40 dB per decade (e.g., microcell and other line-of-sight environments), the effect at intersection points, such as location 320, can be even more pronounced. For example, in a line-of-sight environment, at least nine pilot channels of similar power levels could be received at location 320.

A CDMA system configured in a manner consistent with the IS-95 standard can only decode three pilot and associated traffic channels at any one time. The rest of the signals appear as interference. The fading environment and shadowing of the existence of so many signals cause excess overhead messages between the base station and the mobile as the pilots enter and leave the active set. The IS-95B standard will better handle this situation by only reporting those situations where the system requires the adding or dropping of signals from the active set. This standard will not, however, reduce the amount of interference.

In the case of analog systems, the ratio of the channel power to the level of interference (C/I) can be relatively low at intersection points, such as location 320, because of the presence of many interfering signals. This results in the effective reuse of analog channels being larger than necessary and dominated by locations, such as location 320. The end result is the lowering of the cell site capacity because the reuse distance, from location 320's point of view, becomes higher than necessary.

Therefore, a need exists to reduce the interference resulting from conventional cell site deployment to, thereby, increase the capacity of the cellular network.

SUMMARY OF THE INVENTION

Systems and methods consistent with the present invention address this need by reconfiguring the cell sites to increase the capacity of individual sectors and cell sites.

In accordance with the purpose of the invention as embodied and broadly described herein, a system consistent with the present invention includes first cell sites having a first layout and second cell sites, interspersed among the first cell sites, having a second layout. The layout refers to the orientation of the antennas in the cell sites. By making the second layout different than the first layout, the amount of interference in the system reduces and, thus, the capacity of the system increases.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention reduce interference and, thus, increase the coverage and capacity of a cellular network by changing the direction of the antennas in various cell sites in the network. In this manner, the systems and methods redistribute the analog channels in the case of an analog network and the pilot and associated traffic channels in the case of a CDMA network.

Exemplary Cell Site Reconfiguration

Figure 1:
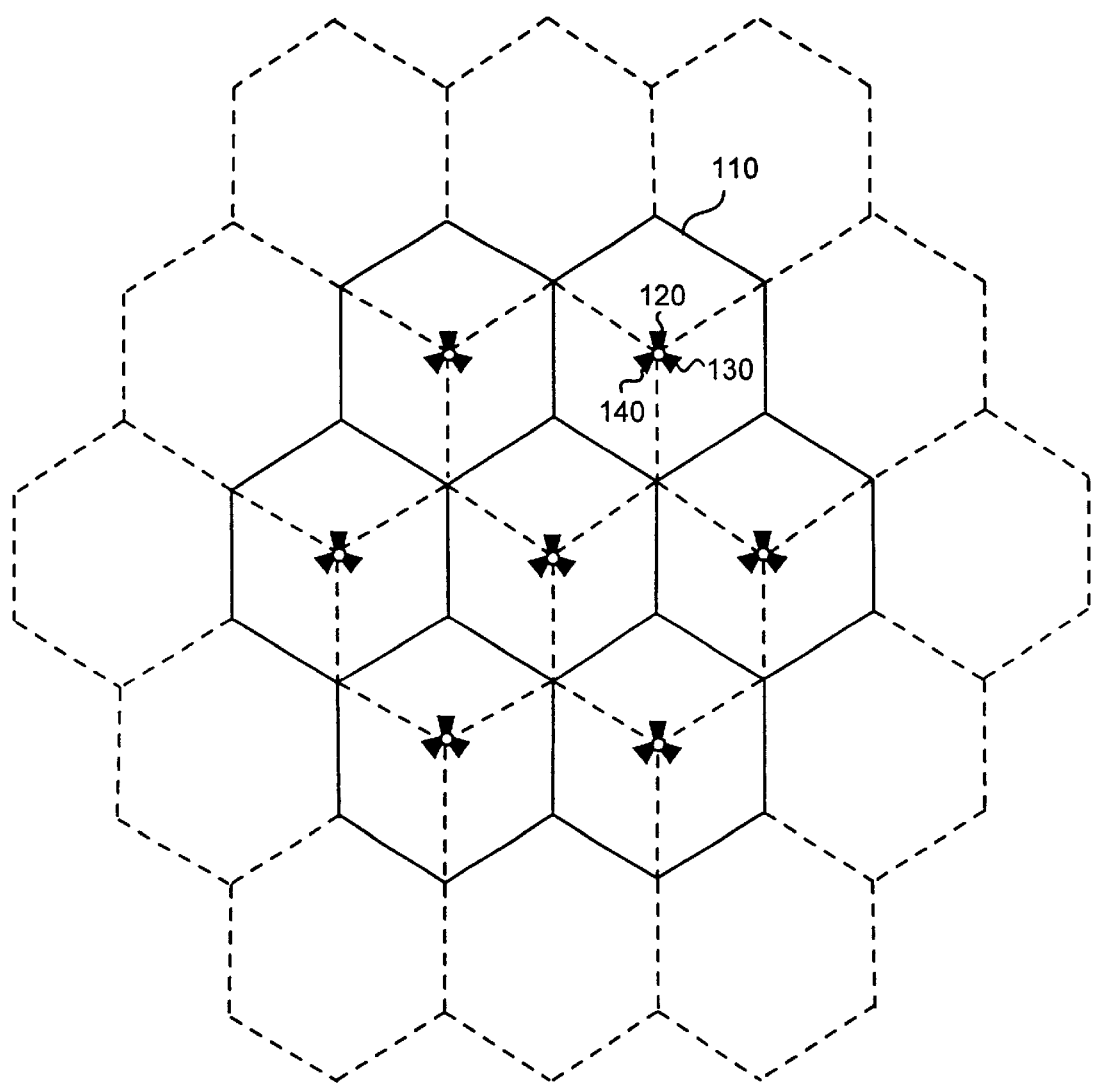
FIG. 1 is a diagram of a conventional three-sectored cell site deployment.
Figure 2:
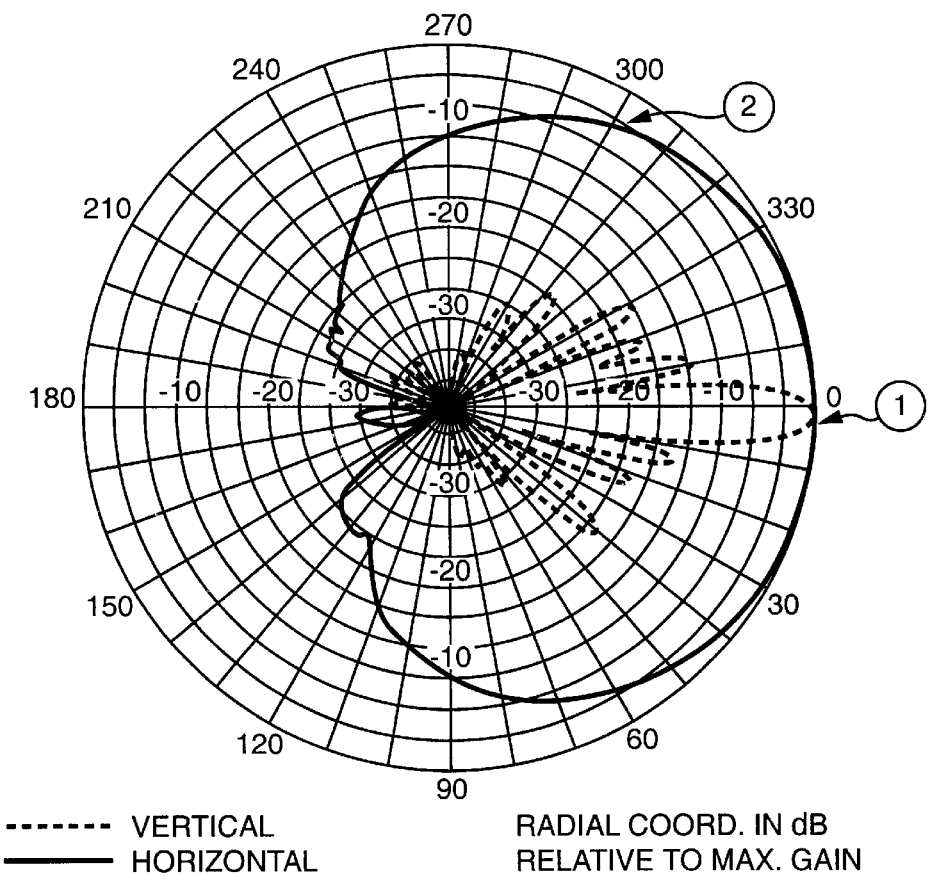
FIG. 2 is a diagram of power levels of signals transmitted by a typical antenna deployed in a cellular network.
Figure 5:
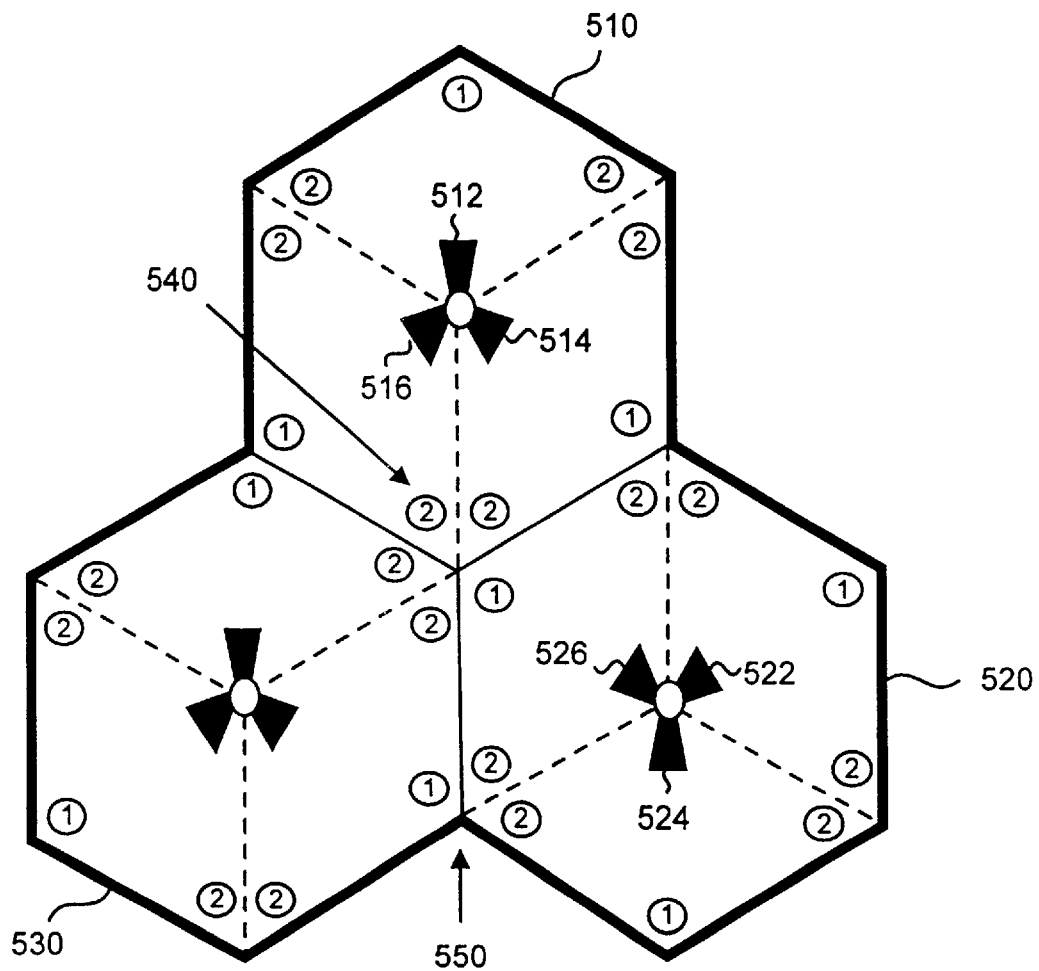
FIG. 5 is a diagram of three-sectored cell sites in an exemplary cell site deployment consistent with the present invention.

FIG. 5 is a diagram of three-sectored cell sites in an exemplary cell site deployment 500 consistent with the present invention. Only three cell sites 510–530 are shown in the figure for simplicity. Cell sites 510 and 530 include antennas arranged in a manner consistent with the conventional cell site deployment described above with regard to FIG. 1. In other words, cell site 510, for example, includes antenna 512 pointing north (0°), antenna 514 pointing southeast (120°), and antenna 516 pointing southwest (240°). Cell site 520, however, includes three antennas rotated by approximately 60 degrees with respect to the antennas in cell sites 510 and 530. In other words, cell site 520 includes antenna 522 pointing northwest (60°), antenna 524 pointing south (180°), and antenna 526 pointing northwest (300°).

FIG. 5 also identifies the power levels at the cell edges, using $\hat{1}$ to identify the highest power level along the bore sight of an antenna and $\hat{2}$ to identify the decreased power level at the cross-over points. The cell site reconfiguration has the effect of reducing the number of major signals at location 540 (corresponding to location 320 in FIGS. 3 and 4), while sacrificing a portion of the performance at location 550 (corresponding to location 310 in FIGS. 3 and 4).

Applicant discovered that the performance of the network is limited by the performance at location 540, not at location 550. Therefore, the additional number of interfering signals at location 550 does not degrade the system. In fact, the power level of the two interfering signals at location 550 is down by $\gamma$ dB with respect to the other signals.

Figure 6:
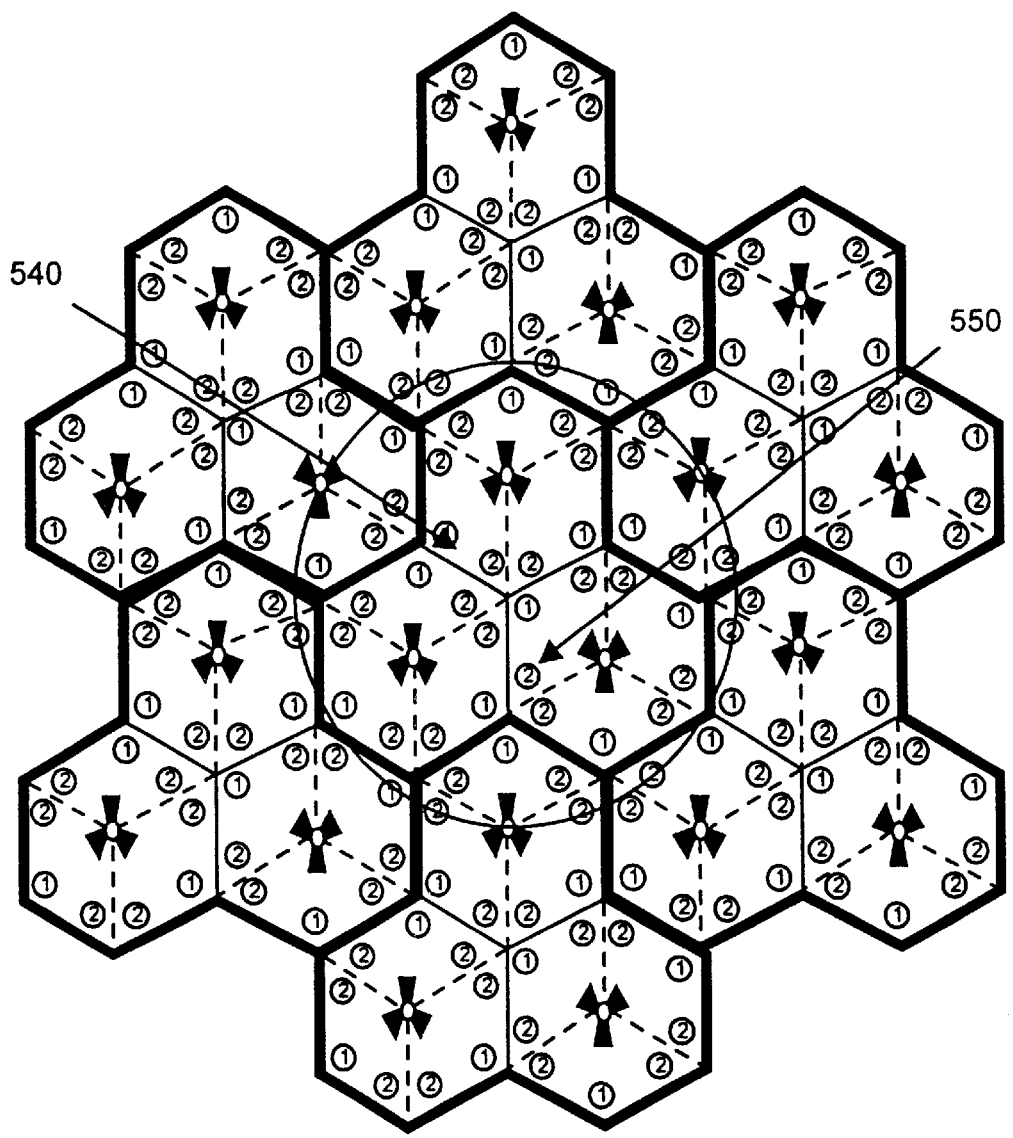
FIG. 6 is a diagram more fully showing the exemplary cell site deployment of FIG. 5.

FIG. 6 is a diagram more fully showing the exemplary cell site deployment of FIG. 5. As the figure shows, the number of interfering signals from second tier cell sites have been reduced by the reorganization of the cell site structure. One less bore sight signal, but two more interfering signals with power levels reduced by $\gamma$ dB below the conventional deployment, exist at location 540. As shown by the experimental results described below, the cell site reconfiguration results in less interference at location 540 and, thus, increases the coverage and capacity of the cellular network.

Experimental Results

Figure 3:
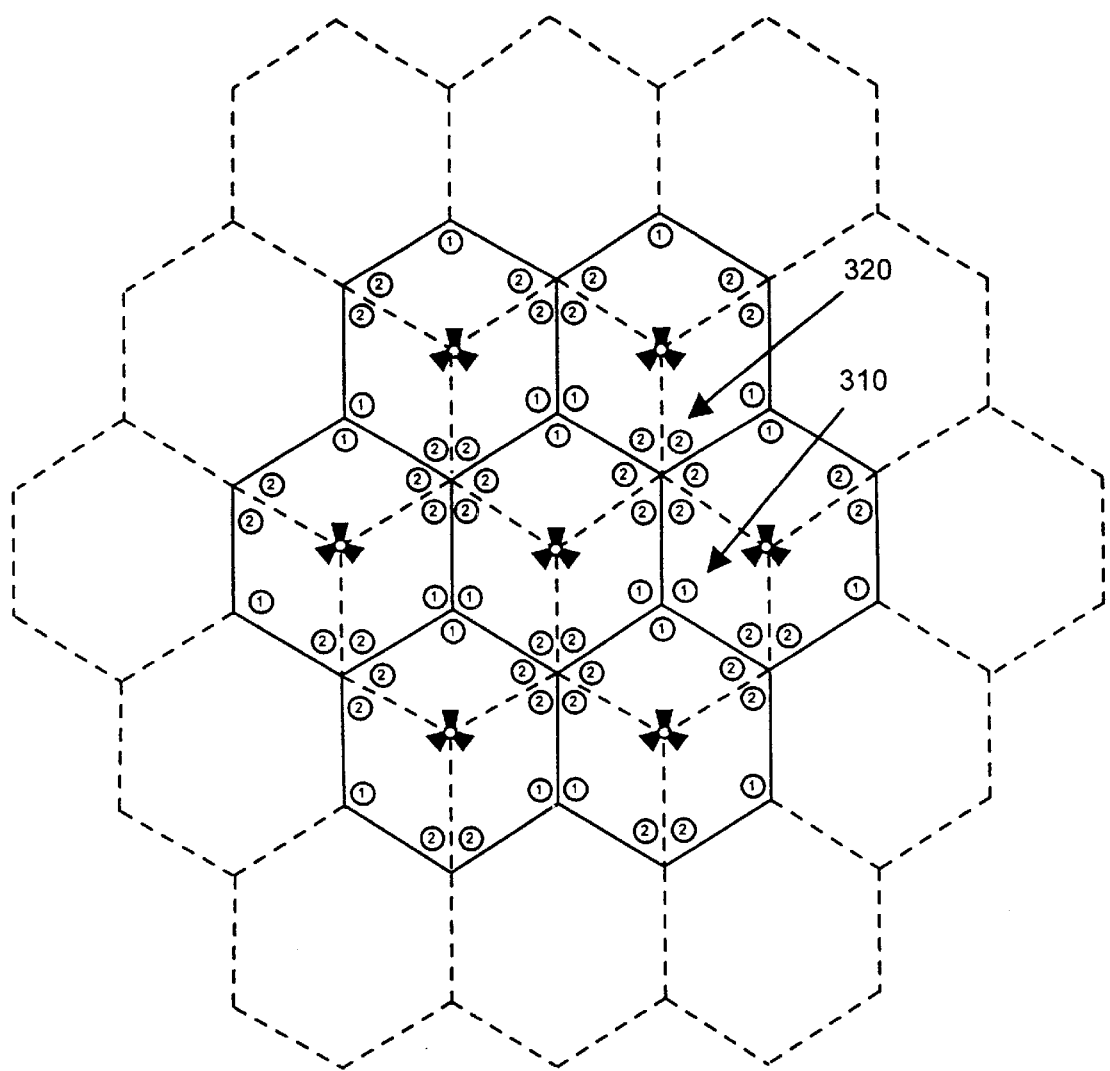
FIG. 3 is a diagram identifying power levels of the cell sites in the conventional cell site deployment of FIG. 1.
Figure 4:
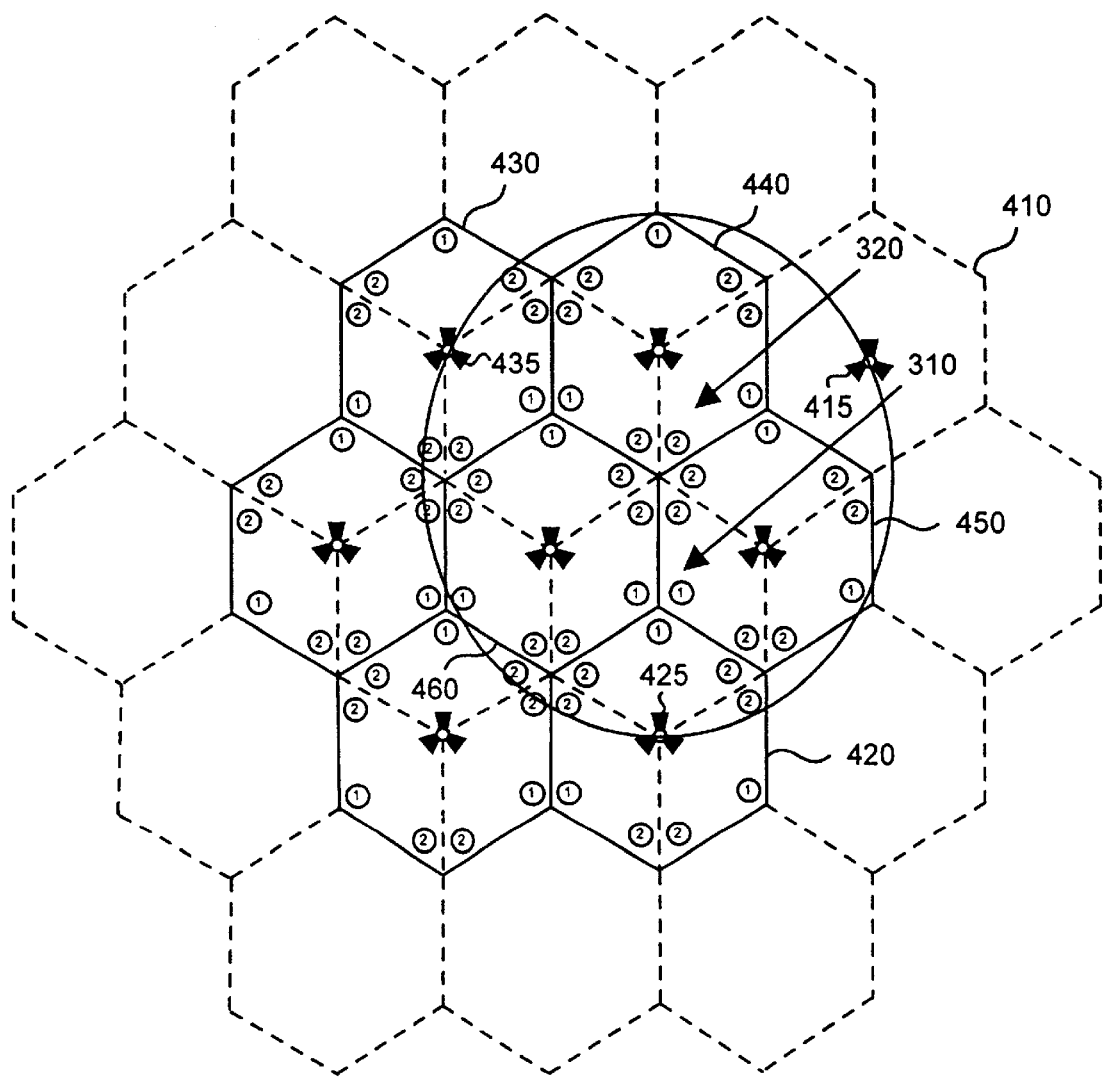
FIG. 4 is a diagram showing the effect of interference caused by second tier cell sites in the conventional cell site deployment of FIG. 1.
Figure 7A:
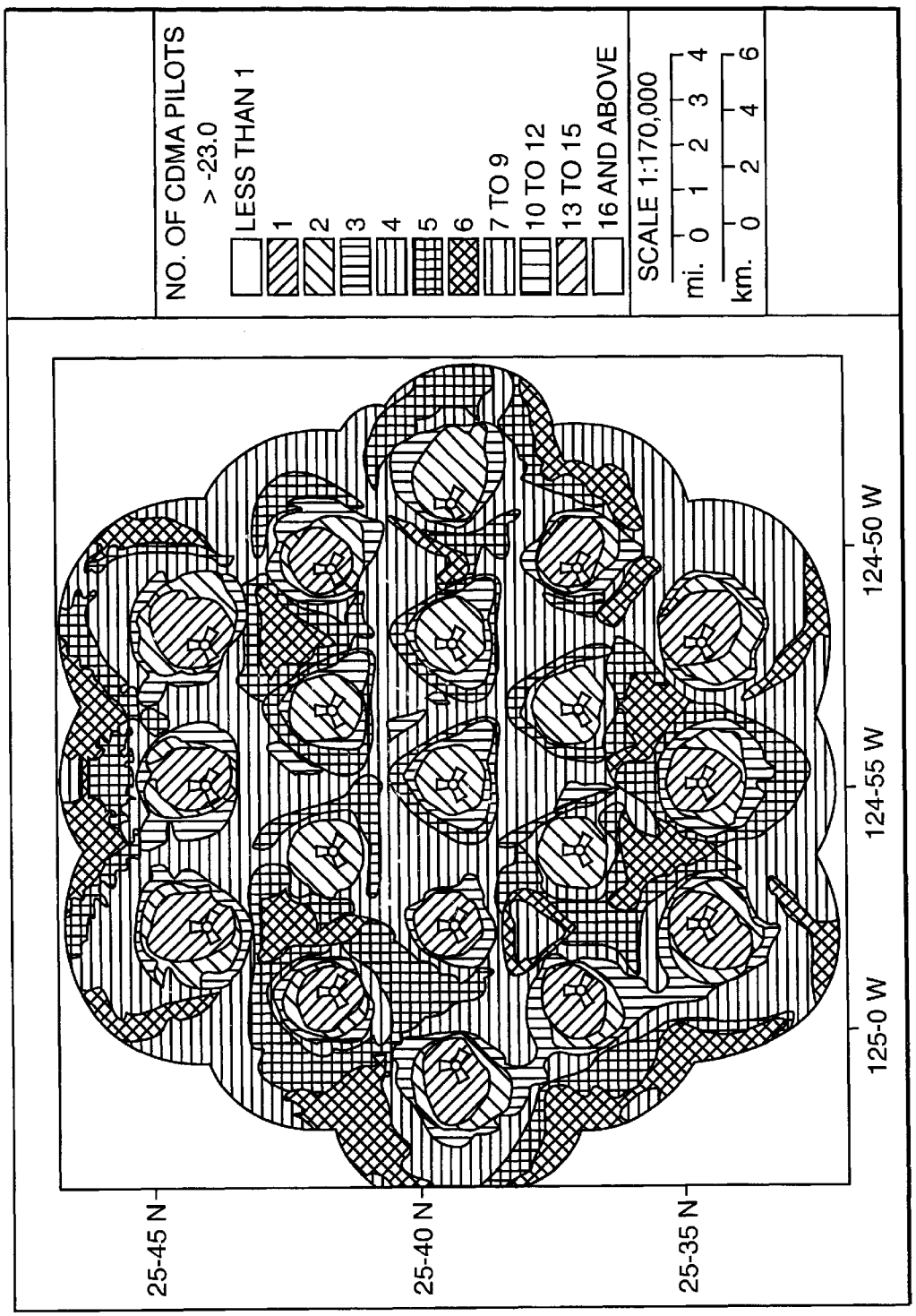
FIG. 7A illustrates a distribution of pilot channels between cell sites for a conventional cell site deployment.

FIG. 7A illustrates a distribution of pilot channels between cell sites for a conventional cell site deployment. In FIG. 7A, only pilot channels above a threshold of Ec/Io>−23 dB (Ec/Io represents the ratio of the energy of a pilot signal to the level of interference) are shown. The largest grouping of pilot channels occurs at crossover points, such as location 320 (FIG. 3). The exact number of pilot channels is a function of the transmitted power levels, the traffic (e.g., eight Erlangs per sector), and the chosen threshold (−23 dB in this case).

Figure 7B:
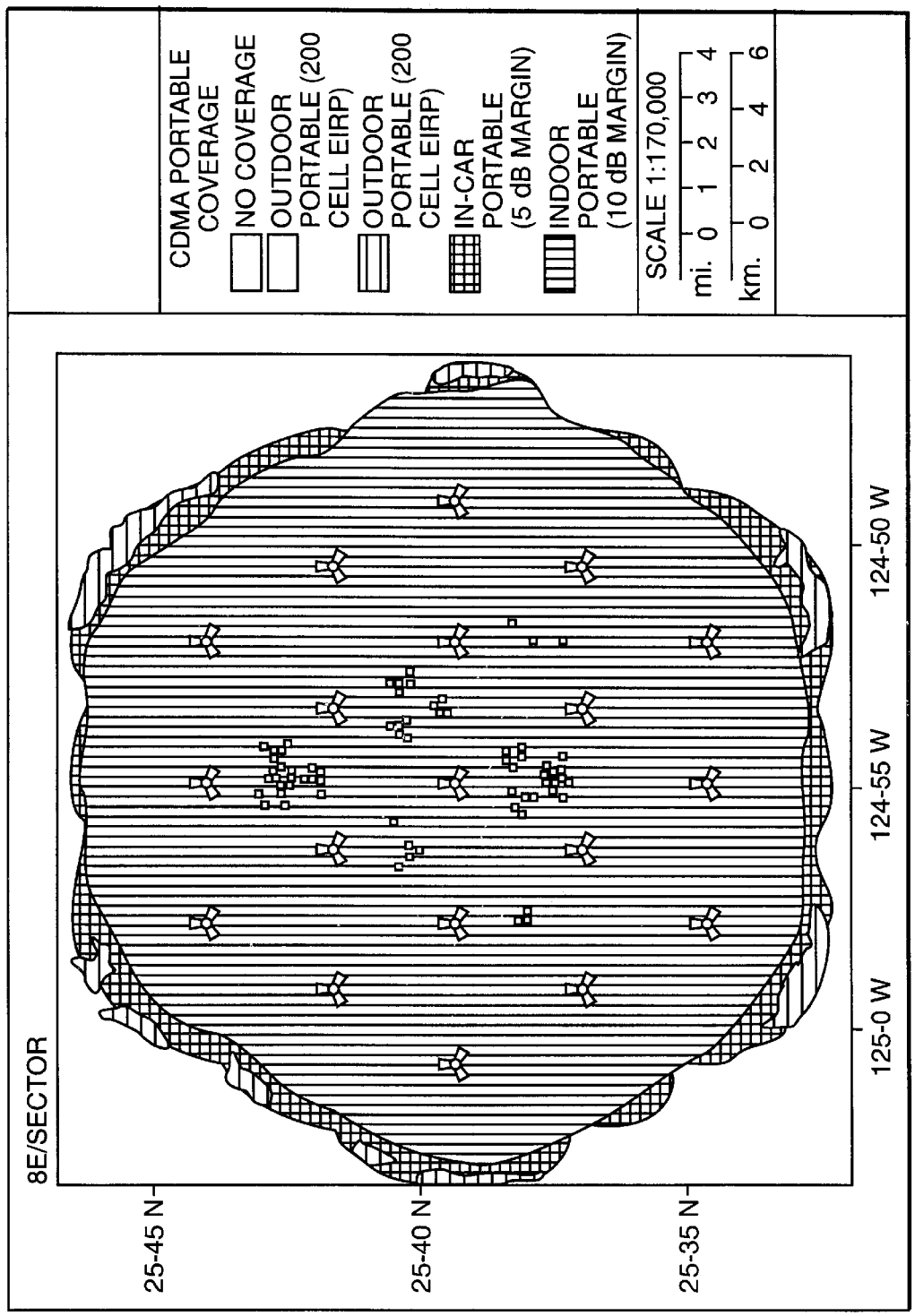
FIG. 7B illustrates CDMA coverage for the conventional cell site deployment shown in FIG. 7A.

FIG. 7B illustrates CDMA coverage for the conventional cell site deployment of FIG. 7A. As shown in the figure, coverage holes exist at locations served by signals originating from the antennas' cross-over points, such as location 320.

Figure 8A:
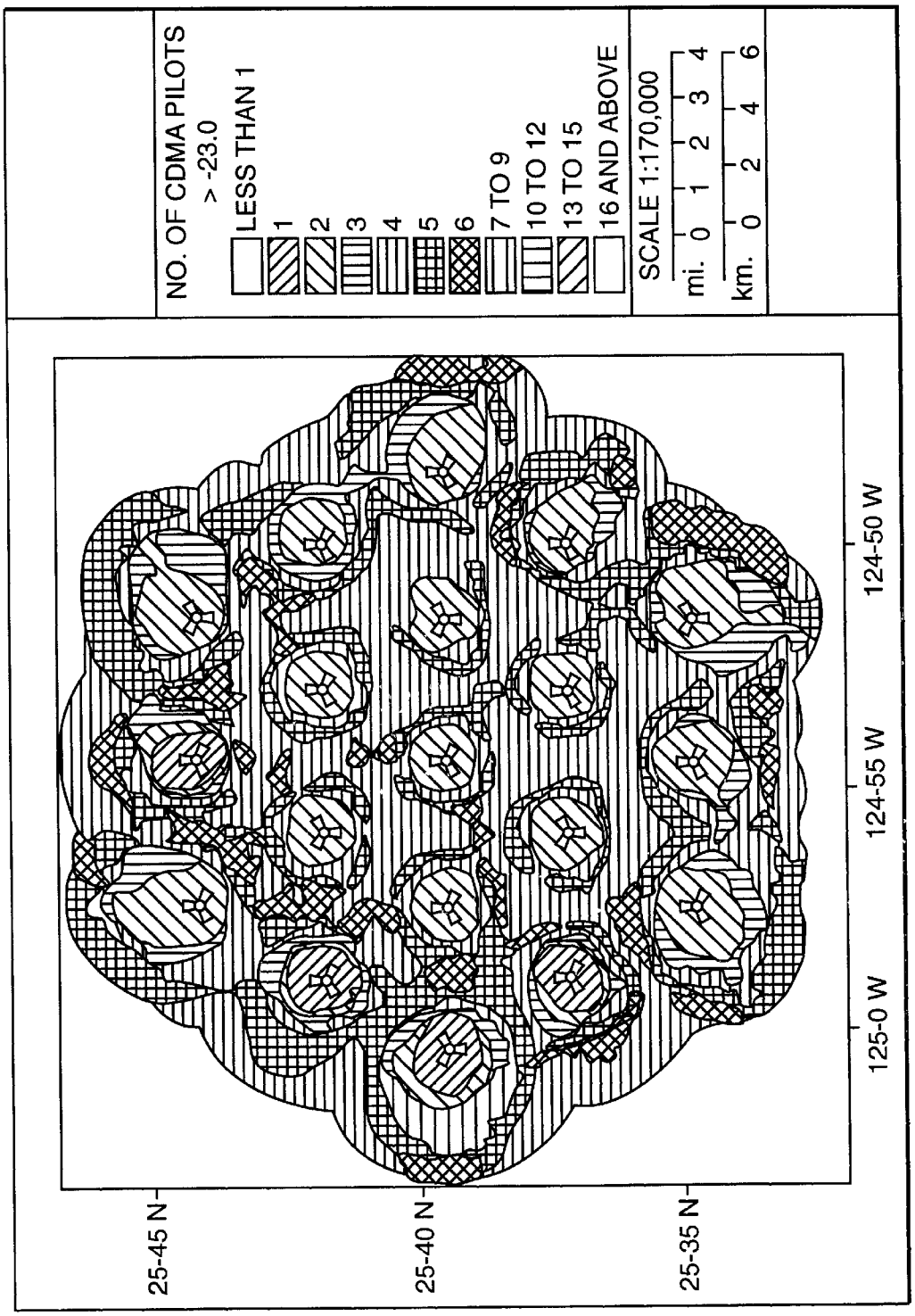
FIG. 8A illustrates a distribution of pilot channels between cell sites for a cell site deployment consistent with the present invention.

FIG. 8A illustrates a distribution of pilot channels between cell sites for a cell site deployment consistent with the present invention. Again, only pilot channels above a threshold of Ec/Io>−23 dB are shown. As shown by the figure, the large grouping of pilot channels at cross-over points, such as location 320, have been reduced.

Figure 8B:
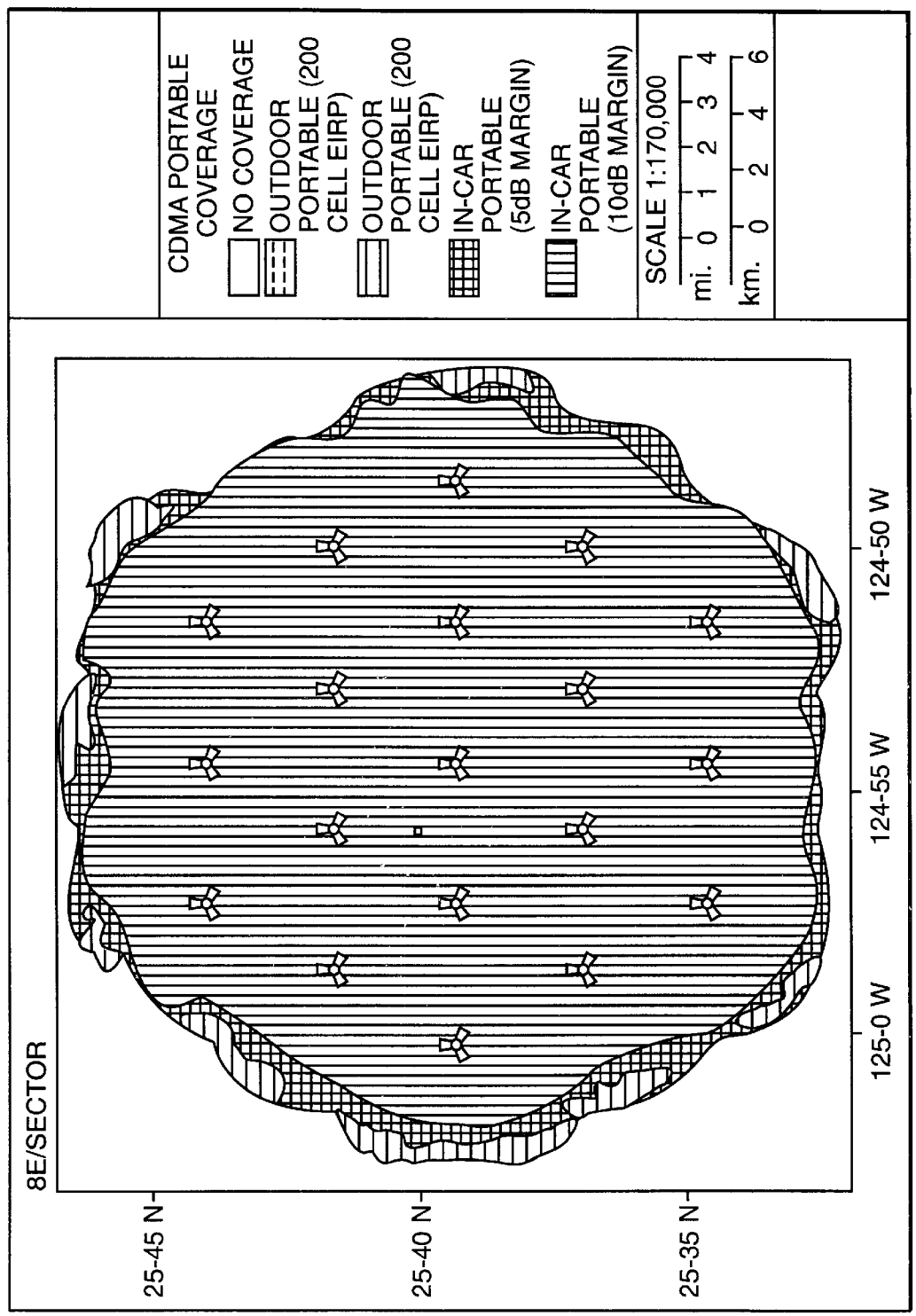
FIG. 8B illustrates CDMA coverage for the cell site deployment shown in FIG. 8A.

FIG. 8B illustrates CDMA coverage for the cell site deployment of FIG. 8A. As shown by the figure, the coverage holes at locations, such as location 320, have been practically eliminated.

Similar results occur in analog systems. A cell site deployment consistent with the present invention redistributes information-bearing channels in an analog system to reduce overall interference levels and, thus, increase the capacity of the system. As a result, antennas can decrease the transmit power levels on their forward links to increase the system capacity.

The systems and methods consistent with the present invention reorganize the cell site layout to decrease interference at the edges of the cell sites and, thus, increase the capacity of the cellular network.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A cellular network with increased capacity, comprising:
   a plurality of first three-sectored cell sites, each of the first cell sites including a first antenna pointing in a first direction, a second antenna pointing in a second direction, and a third antenna pointing in a third direction, each of the first, second, and third directions being separated by approximately 120 degrees; and a plurality of second three-sectored cell sites, each of the second cell sites being surrounded by the first cell sites and including a fourth antenna pointing in a fourth direction, a fifth antenna pointing in a fifth direction, and a sixth antenna pointing in a sixth direction, each of the fourth, fifth, and sixth directions being separated by approximately 120 degrees, the fourth, fifth, and sixth directions being displaced from the first, second, and third directions by approximately 60 degrees.

2. The cellular network of claim 1, wherein the first, second, and third directions are north, southeast, and southwest directions, respectively.

3. The cellular network of claim 1, wherein the fourth, fifth, and sixth directions are northeast, south, and northwest directions, respectively.

4. A method for increasing the capacity of a cellular network having a plurality of cell sites, each of the cell sites including a plurality of antennas pointing in directions separated by approximately 120 degrees, the method comprising:

selecting groups including at least three of the cell sites; and changing an orientation of the antennas for one of the cell sites in each of selected groups, directions of the antennas in the one cell site being displaced from directions of the antennas of other ones of cell sites by approximately 60 degrees, said one of the cell sites being surrounded by the other ones of the cell sites.

5. The method of claim 4, wherein the selecting step includes:

identifying three cell sites for each of the groups.

6. A system for increasing the capacity of a deployed cellular network having a plurality of cell sites, each of the cell sites including a plurality of antennas pointing in directions separated by approximately 120 degrees, comprising:

means for identifying a subset of the cell sites, each of the identified cell sites being surrounded by other ones of the cells sites; and means for changing an orientation of the antennas in each of the identified cell sites, directions of the antennas in the identified cell sites being displaced from directions of the antennas in the other cell sites by approximately 60 degrees.

7. A method for decreasing interference in a cellular network having plurality of cell sites, each of the cell sites including a plurality of antennas, the method comprising:

selecting groups of cell sites;

setting direction of the antennas according to a first layout for a subset of the cell sites in each of the selected groups, the first layout including at least three antennas pointing in first directions separated by approximately 120 degrees; and setting direction of the antennas according to a second layout, different from the first layout, for one of the cell sites in each the selected groups, the second layout including at least three antennas pointing in second directions separated by approximately 120 degrees, the first and second directions being displaced by approximately 60 degrees, wherein said one the cell sites is surrounded by the subset of cell sites.

* * * * *